(12) United States Patent
Shideler

(10) Patent No.: US 6,709,326 B2
(45) Date of Patent: Mar. 23, 2004

(54) HOT AIR PURGE SYSTEM

(75) Inventor: Brandon Lee Shideler, Westland, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/999,415

(22) Filed: Oct. 24, 2001

(65) Prior Publication Data

US 2003/0077997 A1 Apr. 24, 2003

(51) Int. Cl.[7] .................................................. B60H 1/26
(52) U.S. Cl. ......................................... 454/75; 454/162
(58) Field of Search .......................... 454/75, 162, 164, 454/165, 900; 236/49.3

(56) References Cited

U.S. PATENT DOCUMENTS

| | | | |
|---|---|---|---|
| 3,842,288 A | 10/1974 | Bradshaw | |
| 4,136,822 A | * 1/1979 | Felter | ........................ 236/49.1 |
| 4,497,240 A | 2/1985 | Nagatomo et al. | |
| 4,852,469 A | 8/1989 | Chuang | |
| 4,909,044 A | 3/1990 | Gudmundsen | |
| 5,033,672 A | 7/1991 | Sakamoto et al. | |
| 5,167,573 A | * 12/1992 | Kanno et al. | ................ 454/164 |
| 5,259,814 A | 11/1993 | Weissbrich et al. | |
| 5,311,746 A | 5/1994 | Dombrowski et al. | |
| 5,509,852 A | * 4/1996 | Clark | ........................... 454/75 |
| 6,290,593 B1 | * 9/2001 | Weissbrich et al. | ........... 454/75 |

FOREIGN PATENT DOCUMENTS

| | | | |
|---|---|---|---|
| JP | 59-59515 | 4/1984 | |
| JP | 62-275821 | * 11/1987 | ................. 454/900 |

* cited by examiner

*Primary Examiner*—Harold Joyce
(74) *Attorney, Agent, or Firm*—Brinks Hofer Gilson & Lione

(57) ABSTRACT

A method of purging air that includes sensing a first physical property within an enclosed volume of space, sensing a second physical property outside of the enclosed volume of space, calculating a difference between the first and second physical properties; and conveying air out of the enclosed volume of the space if the difference is greater than or equal to a predetermined value.

21 Claims, 2 Drawing Sheets

HOT AIR PURGE SYSTEM

BACKGROUND OF THE INVENTION

1. Field of the Invention

The present invention relates to a system for purging air from an enclosed volume of space, such as the interior of a vehicle.

2. Discussion of Related Art

It is a well-known phenomenon that the cabin of a vehicle, such as an automobile, is often subjected to an abnormal increase in temperature when the vehicle is turned off and is standing under the scorching heat of the sun. Under hot soak conditions caused by high temperatures and sun load, the average temperature of the vehicle can increase by as much as 50 to 60° F. above the outside or ambient temperature. The increase in temperature lengthens the amount of time to comfort the occupants of the vehicle at the time of start up of the vehicle. In addition, when the vehicle has been exposed to hot soak conditions for long periods of time, such as several hours, the seats and interior of the vehicle become thoroughly heated to the higher temperature and, thus, increase the amount of time for reaching a level of comfort for the occupants.

One prior attempt at decreasing the amount of time for reaching a level of comfort for the occupants, is to use a pair of blowers that are powered by a solar panel. The blowers purge the hot air within the interior of the vehicle beginning from the time that the vehicle is turned off. Powering the blowers with a solar panel conserves the energy of the vehicle's battery used to start the vehicle. One disadvantage of this system is that it requires additional components than those that are normally available for a commercial vehicle. The additional components result in a more expensive and complicated vehicle.

It is also well known in the art that purging air from within the interior of a vehicle can be performed to improve the operation of so called electronic automatic temperature control ("EATC") systems. Such EATC systems measure the temperature of the interior of a vehicle. The measured temperature is used by the EATC system to activate subsystems, such as ventilation mode, recirculation door positions, blower speeds and refrigeration cycles, which will lower or raise the interior compartment temperature to meet passenger expectations. Relevant subsystems of the EATC system include ventilation mode, recirculation door positions, blower speeds and refrigeration cycles.

Typically, a sensor or thermosistor measures the temperature of the interior compartment of the vehicle. Before the interior compartment temperature may be accurately measured, air in the immediate area of the sensor must be purged in favor of air pulled in from the interior compartment.

With regard to conventional EATC systems, purging does not typically begin until after the EATC is activated, which occurs after the ignition system of the vehicle is activated. However, it has been suggested to start the purging process before passengers are inside the vehicle and before the vehicle's EATC system is actually started, so that more accurate temperature readings may be made.

One disadvantage of the above-described systems is that they require separate power supplies for the purge system that are separate from the battery of the vehicle which results in an increase in the cost and complexity of a purge system.

In view of the above-described disadvantage, it is an object of the present invention to provide an improved temperature control device for the interior of a vehicle.

It is another object of the present invention to reduce the amount of discomfort an individual feels when entering a vehicle that has been exposed to the sun and/or heat.

It is another object of the present invention is to provide an air purge system that can safely be run off of a vehicle's battery during the time period that a vehicle is turned off.

SUMMARY OF THE INVENTION

One aspect of the present invention regards an air purge system that includes a first sensor for sensing a first physical property within an enclosed volume of space and a second sensor for sensing a second physical property outside of the enclosed volume of space. A blower is in fluid contact with both the enclosed volume of space and outside of the enclosed volume of space. A processor connected to the first and second sensors and the blower, wherein the processor calculates a difference between the first and second physical properties and activates the blower if the difference is greater than or equal to a predetermined value.

A second aspect of the present invention regards a method of purging air that includes sensing a first physical property within an enclosed volume of space, sensing a second physical property outside of the enclosed volume of space, calculating a difference between the first and second physical properties; and conveying air out of the enclosed volume of the space if the difference is greater than or equal to a predetermined value.

A third aspect of the present invention regards an air purge system that includes a blower that is in fluid contact with both an enclosed volume of space and outside of the enclosed volume of space, a power supply connected to the blower and a processor connected to the first and second sensors, the blower and the power supply; wherein the processor activates the blower and senses the power level of the power supply and deactivates the blower should the power level fall below a predetermined power level.

A fourth aspect of the present invention regards a method of purging air that includes activating a blower so as to convey air from an enclosed volume of space to outside of the enclosed volume of space, sensing a power level of a power supply connected to the blower and deactivating the power supply should the sensed power level fall below a predetermined power level.

Each of the above aspects of the present invention provides the advantage of decreasing the cost and complexity of a purge system.

The above third and fourth aspects of the present invention provide the advantage running a purge system off of the battery used to start a vehicle.

The present invention, together with attendant objects and advantages, will be best understood with reference to the detailed description below in connection with the attached drawings.

DETAILED DESCRIPTION OF THE INVENTION

Figure 1:
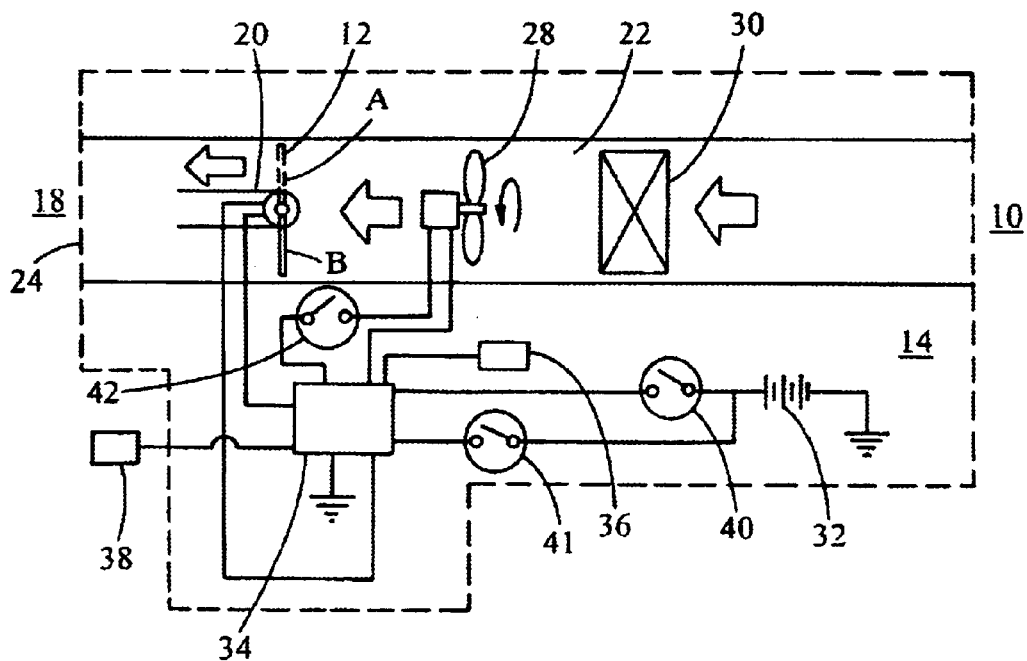
FIG. 1 schematically shows an air purge system according to the present invention.

Referring to the drawings, FIG. 1 shows an embodiment of an air purge system 10 includes an internal and external air change-over damper 12 that is movable from a first position A, that allows for the circulation of internal air within the enclosed interior volume of space 14 of the interior of a vehicle 16, to a second position B, that allows for the interior volume of space 14 of the interior of the vehicle 16 to be in fluid communication with the ambient atmosphere 18 outside the interior of the vehicle 16. The damper 12 is moved from position A to position B and vice versa via a stepper motor 20 in a manner described below. As shown in FIG. 1, the damper 12 is located in a channel or duct 22 that has an opening 24 that is in fluid communication with the ambient atmosphere 18. The channel or duct 22 has another opening 26 that is in fluid communication with the interior volume of space 14 of the interior of the vehicle 16.

A blower 28 and a cooling unit 30 are also located within the channel or duct 22 as shown in FIG. 1. Thus, the blower 28 is in fluid contact with both the interior volume of space 14 and the ambient atmosphere 18 located outside the interior volume of space 14. The damper 12 and the blower 28 are each connected to a power supply, such as battery 32, and a processor or control circuit 34. The battery 32 preferably is used to start and run various electrical components of the vehicle.

Figure 2:
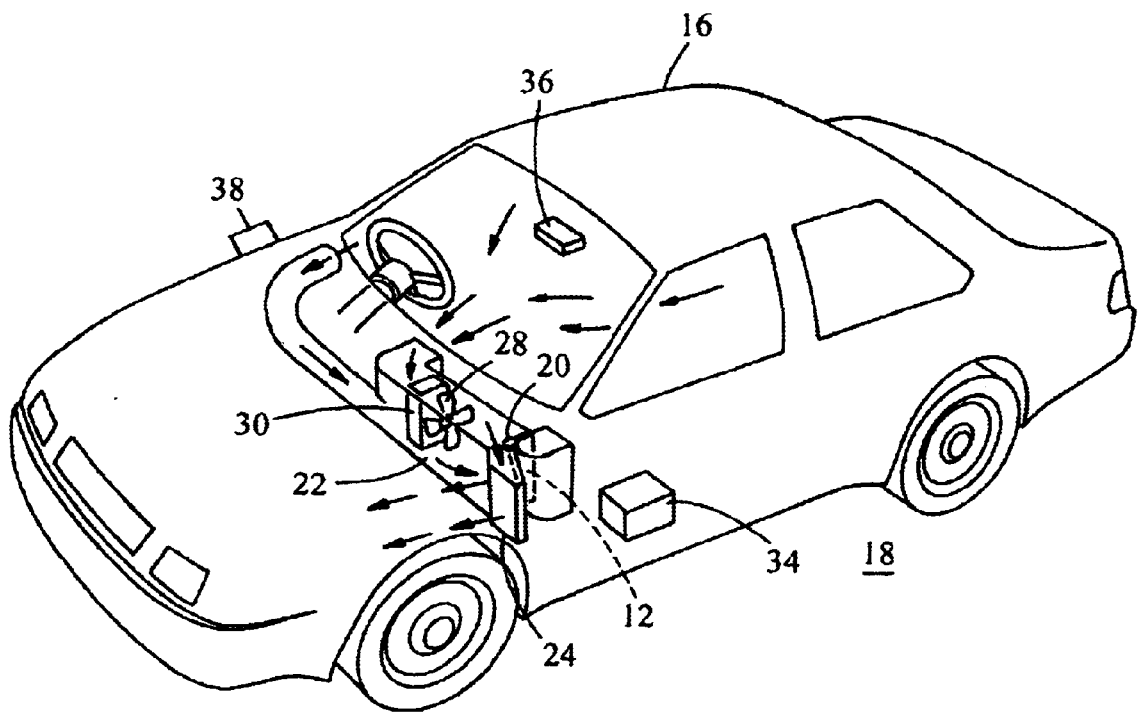
FIG. 2 schematically shows a perspective view of a vehicle employing the air purge system of FIG. 1 according to the present invention.

As shown in FIGS. 1 and 2, an interior sensor 36 for determining a physical property, such as the temperature, of the interior volume of space 14 and an exterior sensor 38 for determining a physical property, such as the temperature, of the ambient atmosphere 18 are each connected to the processor 34.

Figure 3:
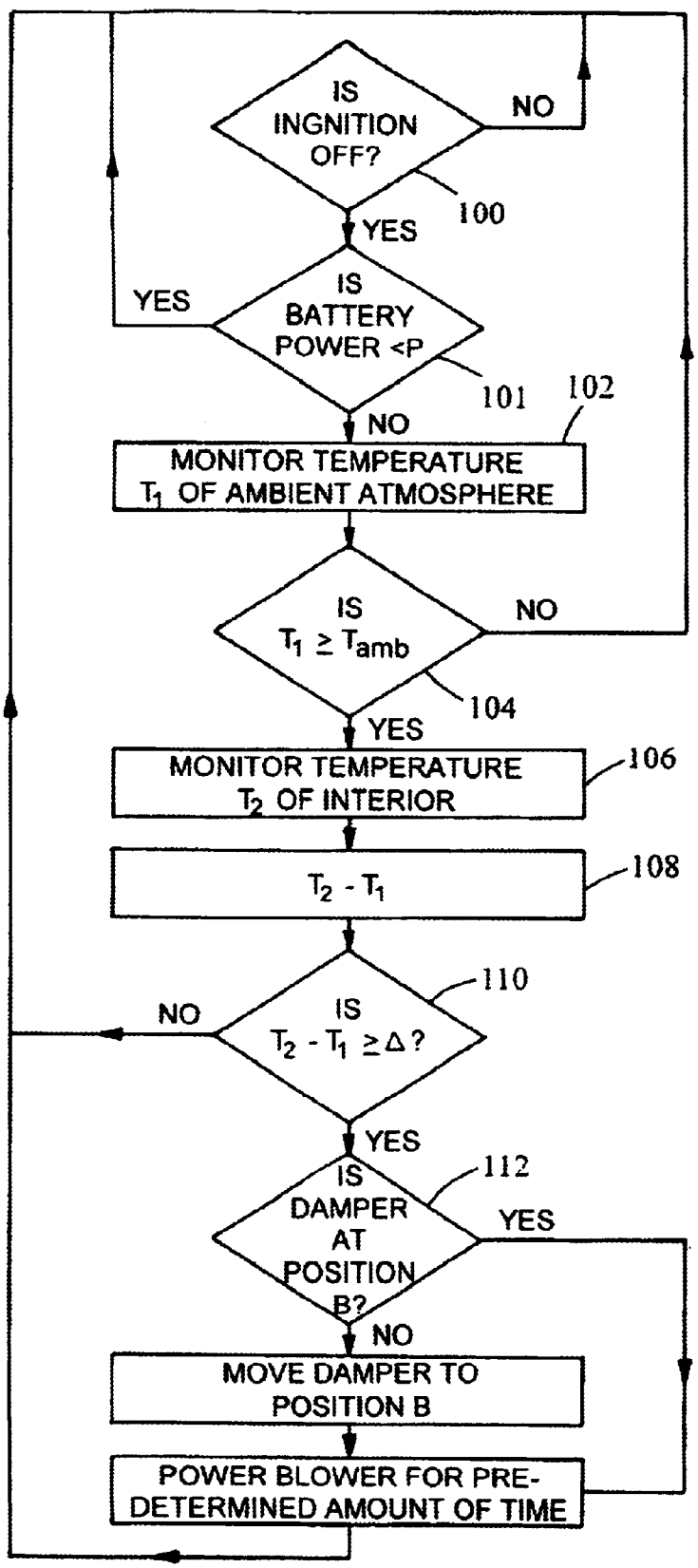
FIG. 3 shows a flow chart demonstrating a mode operating the air purge systems of FIGS. 1 and 2.

A mode of operation of the air purge system 10 is shown in the flow chart of FIG. 3. In operation, the air purge system 10 is enabled upon determining whether the ignition of the vehicle has been turned off, per step 100 of FIG. 3. This causes a switch 40 to close which results in the battery 32 being connected to processor 34 of the air purge system 10. Once powered by the battery 32, the processor 34 determines whether the power level of the battery 32 is about to fall below a predetermined power level, P, which is necessary to safely start the vehicle 20 with the battery 32, per step 101. If it is, then the air purge process is discontinued and the process returns to step 100. If it is not, then the control circuit monitors the temperature of the ambient atmosphere 18 via sensor 38 per step 102.

Should the sensor 38 determine that the temperature of the ambient atmosphere is below a predetermined value $T_{ambient}$, such as 80° F., then the process returns to step 100. Should the sensor 38 determine that the temperature of the ambient atmosphere 18 is at or above the predetermined value $T_{ambient}$, then the processor 34 will monitor the temperatures of both the interior volume of space 14 and the ambient atmosphere 18 via temperature sensors 36 and 38, respectively, per step 104 and 106. Monitoring of the two temperatures will take place at a specific interval of time, such as once every hour.

While the processor 34 monitors the two temperatures, the processor calculates the difference between the two temperature readings by subtracting the temperature reading of sensor 38 from the temperature reading of sensor 36, per step 108. Should the calculated difference be less than a predetermined value Δ, such as 15° F., then the process returns to step 100. Should the calculated difference be greater than or equal to the predetermined value Δ, then the processor 34 determines the position of the damper 12, per steps 110 and 112. If the damper is at position A, then the processor 34 activates the stepper motor 20 so as to move the damper 12 to position B, per step 114.

Once the processor 34 determines that the damper 12 is at position B, the processor 34 closes a switch 42 that results in the battery 32 powering the blower 28, per step 116. The blower 28 is turned on for a predetermined amount of time, such as one minute. Activation of the blower 28 causes the hot air present in the interior volume of space 14 to be removed/purged and expelled into the ambient atmosphere 18. After the predetermined amount of time, the process returns to step 100.

The end result of the above process is that the interior of a vehicle that is shut off and subjected to sun soaked conditions is made more palatable to an individual who enters the interior.

The foregoing description is provided to illustrate the invention, and is not to be construed as a limitation. Numerous additions, substitutions and other changes can be made to the invention without departing from its scope as set forth in the appended claims.

I claim:

1. An air purge system comprising:
   a first sensor for sensing a first physical property within an enclosed volume of space;
   a second sensor for sensing a second physical property outside of said enclosed volume of space;
   a blower that is in fluid contact with both said enclosed volume of space and outside of said enclosed volume of space, wherein said blower is activated for a predetermined amount of time; and
   a processor connected to said first sensor, said second sensor and said blower, wherein said processor calculates a difference between said first and second physical properties and activates said blower if said difference is greater than or equal to a predetermined value.

2. The air purge system of claim 1, wherein said first physical property is the temperature in said enclosed volume of space.

3. The air purge system of claim 1, wherein said second physical property is the temperature outside of said enclosed volume of space.

4. The air purge system of claim 2, wherein said second physical property is the temperature outside of said enclosed volume of space.

5. The air purge system of claim 1, wherein activating said blower causes air to be conveyed from said enclosed volume of space to outside said enclosed volume of space.

6. The air purge system of claim 1, wherein said predetermined amount of time is approximately one minute.

7. The air purge system of claim 1, wherein said enclosed volume of space is located within a vehicle.

8. The air purge system of claim 1, wherein said processor calculates said difference upon determining that said second physical parameter is greater than a second predetermined value.

9. The air purge system of claim 3, wherein said processor calculates said difference upon determining that said second physical parameter is greater than a second predetermined value.

10. The air purge system of claim 9, wherein said second predetermined value is approximately 80° F.

11. The air purge system of claim 1, further comprising a power supply connected to said blower and said processor, wherein said processor senses the power level of said power supply and deactivates said blower should said power level fail below a predetermined power level.

12. The air purge system of claim 7, further comprising a power supply connected to said blower and said processor, wherein said processor senses the power level of said power supply and deactivates said blower should said power level fall below a predetermined power level.

13. The air purge system of claim 12, wherein said power supply comprises a battery of said vehicle.

14. The air purge system of claim 13, wherein said predetermined power level is the power level necessary to safely start said vehicle with said battery.

15. A method of purging air comprising:
sensing a first physical property within an enclosed volume of space;
sensing a second physical property outside of said enclosed volume of space;
calculating a difference between said first and second physical properties; and
conveying air out of said enclosed volume of said space if said difference is greater than or equal to a predetermined value, wherein said conveying is performed for a predetermined amount of time.

16. The method of claim 15, wherein said first physical property is the temperature in said enclosed volume of space.

17. The method of claim 15, wherein said second physical property is the temperature outside of said enclosed volume of space.

18. The method of claim 16, wherein said second physical property is the temperature outside of said enclosed volume of space.

19. The method of claim 15, wherein said predetermined amount of time is approximately one minute.

20. The method of claim 15, wherein said calculating said difference is performed upon determining that said second physical parameter is greater than a second predetermined value.

21. The method of claim 20, wherein said second predetermined value is approximately 80° F.

* * * * *

UNITED STATES PATENT AND TRADEMARK OFFICE
CERTIFICATE OF CORRECTION

PATENT NO. : 6,709,326 B2
DATED : March 23, 2004
INVENTOR(S) : Brandon L. Shideler It is certified that error appears in the above-identified patent and that said Letters Patent is hereby corrected as shown below:

Column 4,
Line 65, before "below" delete "fail" and substitute -- fall -- in its place.

Signed and Sealed this

Seventeenth Day of August, 2004

JON W. DUDAS
*Acting Director of the United States Patent and Trademark Office*